Dec. 31, 1957 J. G. JOHNSTON 2,818,124
HELICOPTER BLADE MOUNTING MECHANISM
Filed June 6, 1955 2 Sheets-Sheet 1
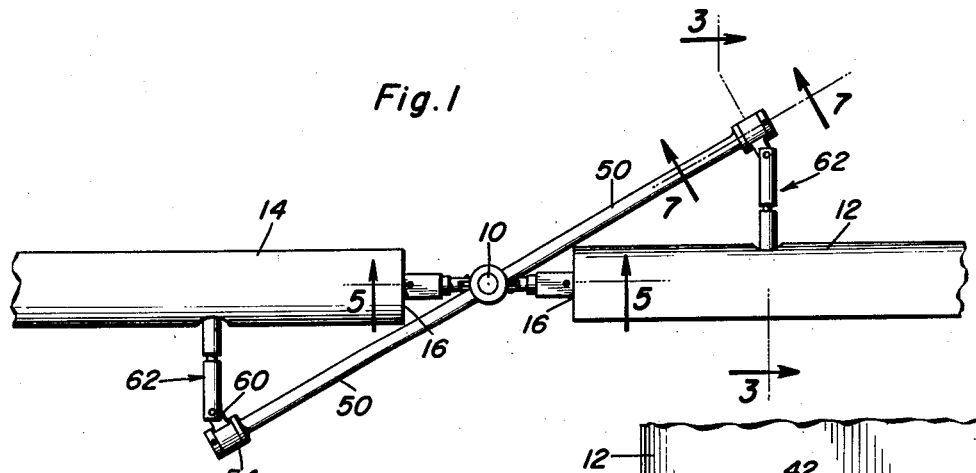
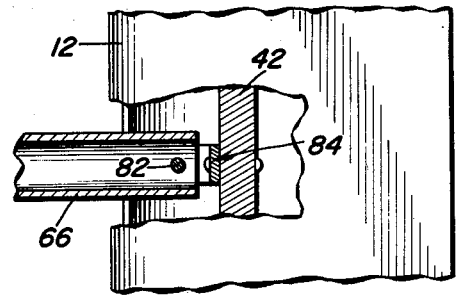
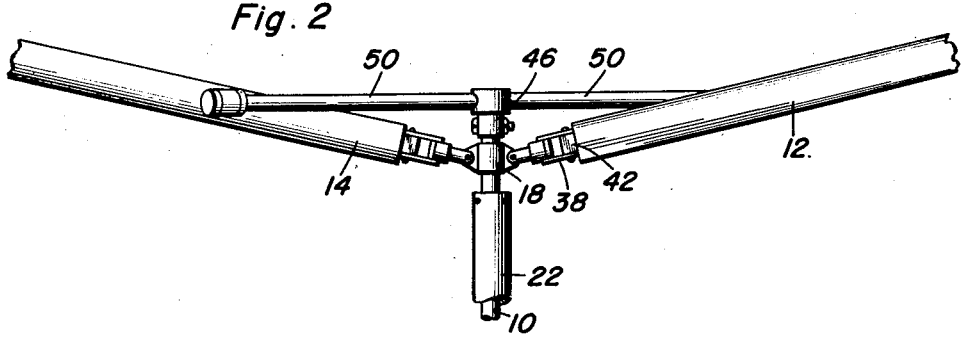
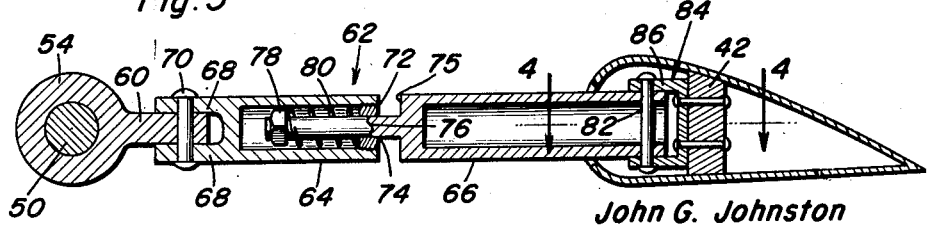
John G. Johnston
INVENTOR.

Dec. 31, 1957  J. G. JOHNSTON  2,818,124
HELICOPTER BLADE MOUNTING MECHANISM
Filed June 6, 1955  2 Sheets-Sheet 2
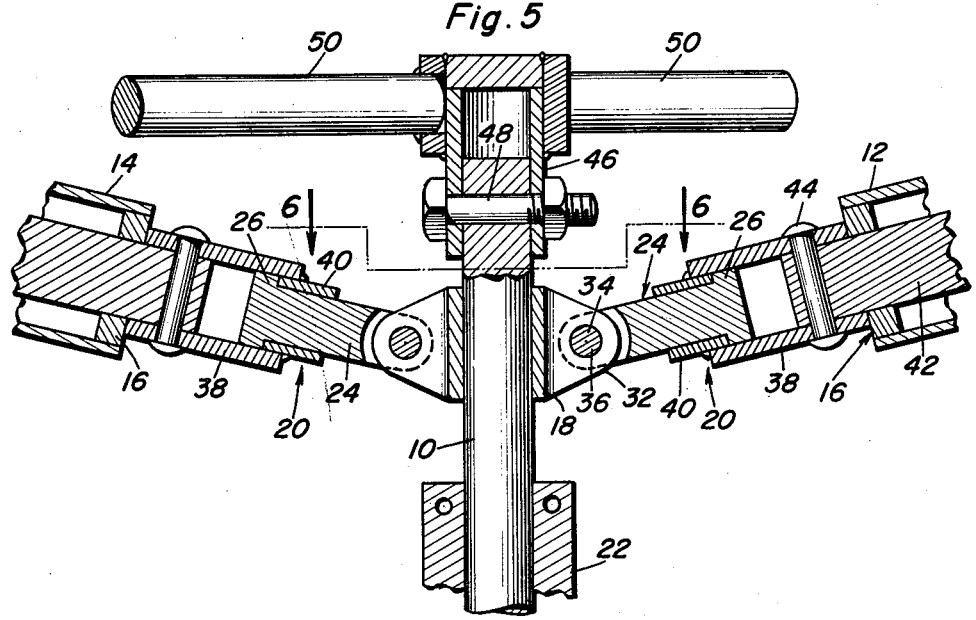
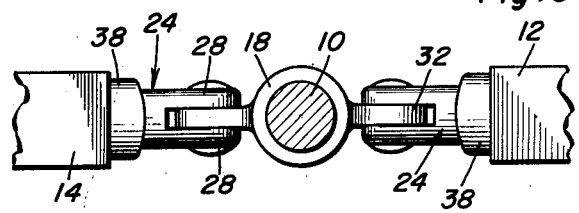
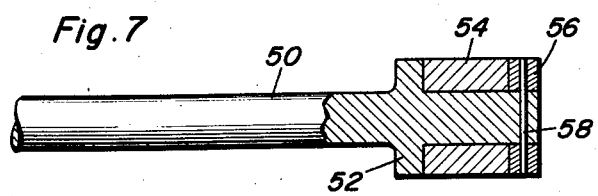
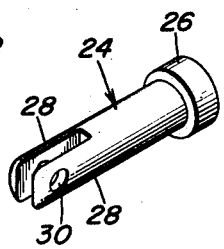
John G. Johnston
INVENTOR.

United States Patent Office 2,818,124
Patented Dec. 31, 1957

2,818,124

HELICOPTER BLADE MOUNTING MECHANISM

John G. Johnston, Palmdale, Calif.

Application June 6, 1955, Serial No. 513,180

2 Claims. (Cl. 170—160.57)

The present invention relates to rotary wing aircraft and more particularly relates to means for mounting the rotor blades or wings for such aircraft.

The primary object of the present invention is to provide means for mounting the rotary blades of rotary winged aircraft which reduce the bending forces on the blades at the blade hub.

A further object of the invention ancillary to the primary object is to provide a rotary blade mounting construction which makes it possible to drive a large blade therein with a relatively uncomplicated mounting mechanism securing the rotary blade to its driveshaft.

In the construction of the present invention, freely slidably and rotatably mounted on a rotatable driveshaft is a blade hub having ears at diametrically opposite sides thereof to which ears are fastened in a pivotal manner short links to the free ends of which are attached rotary sleeves which pivotally connect at their free ends to the root ends of the rotary blades and more particularly to the spires of the blades.

Also mounted on the driveshaft above the blade hub is a second hub or collar which has extending from diametrically opposite sides thereof projecting pull bars which extend at an angle to the drive shaft different from that of the blades so that pull bars have their free ends disposed away from the blades. Pull links interconnect the free ends of the pull bars to an intermediate portion of each of the helicopter rotary blades and the collar from which the pull bars extend is fixedly attached to the driveshaft of a helicopter for rotation therewith. The pull links are extensible and pivotally attached about vertical pivots to both the free ends of the pull arms and to short connecting members connecting them to the rotary blades. The connection from the rotary blades to the pull links is such that the rotary blades are permitted to swing or pivot axially relative to the pull links.

Thus, the actual force causing the wings to rotate from the driveshaft comes through the pull bars and the pull links so that the pull bar mounting collar absorbs all twisting and pulling forces while only the bending and lifting forces are taken by the blade spires and blade hub.

In view of the above, it will be seen that a further object of the invention is to provide a pull link construction whereby the rotary blades may assume a horizontal position through centrifugal force of rotation while as the blade lift is increased, the blade may assume a coning position due to the construction of the pull links and the mounting of the blade hub on the driveshaft relative to the pull bar collar.

Basically, therefore, it is an object of the invention to provide a drive mechanism for driving rotary blades from a driveshaft in a rotary wind aircraft wherein the bending, twisting, lifting and pulling forces are divided and absorbed by separate members which mechanism enables the droop, coning and drag actions of the blade to be automatically compensated for.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1 is a top view of the rotary blade drive mechanism constituting the present invention;

Figure 2 is a side elevational view of the blade mounting mechanism constituting the invention;

Figure 3 is a cross sectional view disclosing the connection of one of the pull links to the rotary blade and the pull bar taken substantially along the plane of section line 3—3 of Figure 1;

Figure 4 is an enlarged elevational view on another detail of the pull link connection to the rotary blade with parts being broken away for clarity of detail;

Figure 5 is a cross sectional view through the mounting mechanism taken substantially along the plane of section line 5—5 of Figure 1;

Figure 6 is a cross sectional vew taken substantially through the plane of section line 6—6 of Figure 5;

Figure 7 is a cross sectional view through the end of the pull bar taken substantially along the plane of section line 7—7 of Figure 1; and Figure 8 is a detailed view in perspective of one of the rods connecting the root ends of the blades to the blade hub.

Referring now to the drawings in detail, there is shown a central driveshaft 10 from the diametrically opposite sides of which extend rotary wings or blades 12 and 14 respectively. The root ends 16 of the blades are connected to a blade hub 18 freely slidably and rotatably journalled on the driveshaft 10 through the medium of a linkage 20.

Noting Figures 2 and 5, it will be seen that the driveshaft 10 has the lower portion thereof housed in a suitable housing 22 which mounts the same to the body of the ship (not shown).

The mechanism or means 20 connecting the root ends 16 of the blades 12 and 14 to the blade hub 18 consists primarily of an elongated cylindrical rod 24 having an enlarged cylindrical end portion 26 at one end thereof and being provided with furcations 28 at the other end thereof. The furcations 28 have aligned apertures therethrough and straddle an ear 32 projecting from the blade hub 13. Horizontally disposed pin 34 extends through the aligned apertures 30 and aperture 36 in the ear 32 and swingably mounts one end of the pin 24 on the hub 18 for vertical swinging movement relative thereto. Lugs 38 project beyond the enlarged outer end 26 of the rod 24 and bushing 40 rotatably surrounding the main body portion of the rod 24 and of a cross sectional thickness equal to the height of the annular shoulder formed by the enlarged end portion 26 is welded or otherwise suitably attached to the inner end portion of the lugs 38. Thus, the lugs 38 are rotatably journalled on the rod 24. Further, the sleeve 40 is also movable lengthwise along the rod 24 as will be noted from an examination of Figure 5.

Each of the rotary blades 12 and 14 includes a longitudinal spar 42 extending therethrough and having an inner end portion thereof extending through the root portion 16 of each blade. A vertically disposed pin 44 journalled through apertures through the free end portions of the lugs 38 extends through an aligned transverse bore through the spar 42 and fixedly attaches the root end of the wing or blade 12 or 14 to the lugs 38.

It is apparent that with this construction alone, the blade would not be supported for radial extension from the driveshaft or for rotation by the driveshaft 10.

Accordingly, mounted on the driveshaft 10 for rotation therewith above the blade hub 18 is a second hub or collar 46 which may be termed a pull bar hub. This hub is bolted or otherwise fixedly secured to the shaft 10 as at 48 and has extending radially from diametrically opposite sides thereof pull bar 50, which rods are fixed at their inner ends to the hub 46.

The outer end of each pull bar 50 has formed adjacent thereto an annular flange 52 which serves as a stop shoulder for collar 54 rotatably journalled on the outer end portion of the shaft. Bushing 56 is pinned to the end of the shaft by means of a suitable pin 58 to restrain collar 54 against longitudinal movement outwardly from the bar 50. Thus, the collar 54 is permitted to rotate about the bar 50 but is not permitted any longitudinal movement with respect thereto. Each collar 54 is provided with a radial extension 60 shown most clearly in Figure 3, which connects the pull bar link mechanism 62 thereto.

The pull bar link mechanism 62 consists of a pair of aligned cylindrical members 64 and 66 respectively. The member 64 has at the remote end thereof a pair of furcations 68 which straddle the ear 60 extending from the collar 54 on the pull bar 50. Fastener 70 pins the cylindrical section 64 to the ear 60 for horizontal swinging movement relative thereto.

The adjacent end 72 of the cylindrical member 64 is provided with an aperture 74 opening into the hollow interior thereof. The adjacent end 75 of the second cylindrical member 66 of the pull bar link mechanism 62 is provided with a longitudinally projecting rod 76 which extends through the aperture 74 into the interior of the cylindrical member 64. The end of the rod 76 is threaded and receives a suitable nut 78. Spring 80 surrounding the portion of the rod 76 extending into the hollow interior of the cylindrical member 64 reacts against the nut 78 and the adjacent end 72 of the cylindrical member 64 to normally draw the adjacent ends 72 and 75 of the members 64 and 66 toward one another.

The remote end of the cylindrical member 66 of the link mechanism 62 is open and has a vertically disposed pin 82 extending diametrically therethrough.

To each spar 42 there is fixedly attached a channel bracket 84, the remote end of the cylindrical member 66 being received between the legs 86 of the channel bracket. Link pin 82, as will be noted particularly in Figure 3, extends through the legs 86 as well as the cylindrical member 66.

As thus disclosed, it will be seen that the link mechanism 62 is swingable about its related pull bar 50 with the lift angle of each rotary wing being automatically current controlled by the angle of the link mechanism 62 with respect to its associated pull bar 50.

Thus, when the drive shaft 10 is rotating at relatively low speeds, the dihedral angle of the rotary blades 12 and 14 will be relatively slight and consequently the link mechanism 62 will project substantially horizontally thereby disposing the rotary blades substantially horizontally with a minimum angle of incidence of the blades. As the speed of rotation of the drive shaft 10 increases, the dihedral angle of the rotary blades increases due to the natural coning action. As this angle increases, by virtue of their relation to the link mechanism 62, the rotary wings 12 and 14 assume greater angles of lift since as the coning action of the blades increases due to the increased speed, the mechanisms 62 swing downwardly about the pull bars 50. With this arrangement, therefore, the lift of the heliocopter can be controlled solely by the throttle setting. With two contra-rotating blades, the throttle is therefore the only control needed to fly the machine with the exception of a shift of the pilot's weight for directional control.

Bending and lifting stresses taken by the spar 42 and the blade hub 18 are greatly reduced by virtue of the link connection at 84 to an intermediate portion of each of the spars 42 and all twisting, and pulling forces are taken by the pull bars 50 and pull bar hub 46.

With this construction, it is seen that the stresses on the rotating blades 12 and 14 are divided and simplified somewhat since each of the hub mountings 18 and 46 absorb a specified portion of the stresses and assist one another in the coning, droop and drag actions of the blades, acting as automatic compensators therefor.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A helicopter rotor for an upright drive shaft and having blades, said rotor comprising a hub rotatably disposed on said drive shaft, rods pivotally attached to said hub, said blades rotatably journaled on said rods to thereby mount said blades for movement on said hub, a pair of arms secured to and extending laterally of said drive shaft, means connecting the inner ends of said arms to said drive shaft, means connecting the outer ends of said arms to said blades and including for each blade a cylindrical member having an open end, means pivotally securing the opposite end of said cylindrical member to the outer end of one of said arms, a second member having a rod extending from one end and disposed in the open end of said cylindrical member, means securing said second member to one of said blades, and resilient means opposing longitudinal motion in one direction of said members with respect to each other.

2. The helicopter rotor of claim 1 wherein said second member is passed through the leading edge of the blade to which it is attached.

References Cited in the file of this patent

UNITED STATES PATENTS

| 1,149,901 | Ellett | Aug. 10, 1915 |
| 1,927,966 | Vaughn | Sept. 26, 1933 |
| 1,979,616 | Haidle et al. | Nov. 6, 1934 |
| 2,070,686 | Rutherford et al. | Feb. 16, 1937 |
| 2,184,294 | Fergueson | Dec. 26, 1939 |
| 2,569,061 | Hunt | Sept. 25, 1951 |
| 2,682,926 | Evans | July 2, 1954 |

FOREIGN PATENTS

| 131,419 | Great Britain | Aug. 14, 1919 |
| 426,197 | Great Britain | Mar. 25, 1925 |
| 796,840 | France | Apr. 16, 1936 |